T866001

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 2, 1969

866 O.G. 21

788,684

METHOD FOR COATING SELECTED PORTIONS OF AN ARTICLE WITH A PLASTIC COATING MATERIAL

Raymond E. Sutherland, Kingsport, Tenn., assignor to Eastman Kodak Company, Rochester, N.Y., a corporation of New Jersey

Continuation of application Ser. No. 467,756, June 28, 1965. This application Dec. 23, 1968. Published Sept. 2, 1969

Int. Cl. B44d *1/14;* C23d *1/00*

U.S. Cl. 117—21

No Drawing. 8 Pages Specification

A method for coating selected portions of a heat conductive article including the steps of heating the article to a temperature below its flow-out temperature, contacting a portion of the article with a first plastic coating material, heating the article to the flow-out temperature of the first plastic coating material, cooling the article, heating the article to a temperature below the flow-out temperature of the article and the first plastic coating material, contacting another portion of the article with a second plastic coating material having a substantially lower flow-out temperature than the first coating material, heating the article to the flow-out temperature of the second plastic coating material, and cooling the article.